United States Patent
Mayr et al.

(10) Patent No.: US 9,383,183 B2
(45) Date of Patent: Jul. 5, 2016

(54) PRESSURE INDICATOR

(71) Applicant: MAGNA STEYR Fahrzeugtechnik AG & Co KG, Graz (AT)

(72) Inventors: Franz Mayr, St Marein bei Graz (AT); Carsten Schmidt, Allerheiligen b.W. (AT); Alexander Schärfl, Graz (AT)

(73) Assignee: MAGNA STEYR Fahrzeugtechnik AG & Co KG, Graz (AT)

(*) Notice: Subject to any disclaimer, the term of this patent is extended or adjusted under 35 U.S.C. 154(b) by 325 days.

(21) Appl. No.: 14/052,717

(22) Filed: Oct. 12, 2013

(65) Prior Publication Data

US 2014/0102354 A1    Apr. 17, 2014

(30) Foreign Application Priority Data

Oct. 12, 2012 (EP) .................................. 12188365

(51) Int. Cl.
| | | |
|---|---|---|
| *G01B 5/30* | (2006.01) | |
| *G01L 19/06* | (2006.01) | |
| *G01L 19/10* | (2006.01) | |
| *F16K 17/16* | (2006.01) | |

(52) U.S. Cl.
CPC .............. *G01B 5/30* (2013.01); *F16K 17/1606* (2013.01); *G01L 19/0618* (2013.01); *G01L 19/10* (2013.01)

(58) Field of Classification Search
CPC ................................................. F16K 17/1606
USPC ........................................................ 116/272
See application file for complete search history.

(56) References Cited

U.S. PATENT DOCUMENTS

| | | | | |
|---|---|---|---|---|
| 3,779,080 A | * | 12/1973 | Smith ..................... | G01L 7/086 116/272 |
| 4,512,278 A | * | 4/1985 | Winther .............. | B60C 23/0496 116/272 |
| 2004/0159352 A1 | | 8/2004 | Friedlmeier et al. | |
| 2006/0231013 A1 | * | 10/2006 | Lane ........................ | G01L 7/166 116/272 |

FOREIGN PATENT DOCUMENTS

| | | |
|---|---|---|
| CN | 1217689 A | 5/1999 |
| CN | 1310796 A | 8/2001 |
| DE | 916 140 C | 8/1954 |
| DE | 1 000 197 B | 1/1957 |
| DE | 200 21 823 U1 | 3/2001 |
| EP | 1 219 942 A1 | 7/2002 |
| JP | S60-161605 A | 8/1985 |
| JP | S60-161605 U | 10/1985 |

(Continued)

OTHER PUBLICATIONS

Kousuke Kumondai, Japanese Patent Application No. 2013-213543 Notice of Reasons for Rejection, Aug. 19, 2014, pp. 1-3, Japan Patent Office, Japan. English abstract submitted.

*Primary Examiner* — Daniel S Larkin
*Assistant Examiner* — Irving A Campbell
(74) *Attorney, Agent, or Firm* — Jordan IP Law, LLC; Todd A. Vaughn

(57) ABSTRACT

A pressure indicator for a high-pressure accumulator system, and which includes a pressure indicating element having a channel. The pressure indicating element moves between a starting position and a pressure-indicating position in response to pressure on a side facing a pressure-monitoring region and which is counter to a force of at least one compression spring on the pressure indicating element.

18 Claims, 2 Drawing Sheets

(56) References Cited

FOREIGN PATENT DOCUMENTS

| JP | S61-54242 U | 4/1986 |
| JP | 2003-262299 A | 9/2003 |
| JP | 2009-270987 A | 11/2009 |
| WO | 97/42044 A1 | 11/1997 |

* cited by examiner

PRESSURE INDICATOR

CROSS-REFERENCE TO RELATED APPLICATIONS

The present application claims priority 35 U.S.C. §119 to European Patent Publication No. EP 12188365.6 (filed on Oct. 12, 2012), which is hereby incorporated by reference in its entirety.

TECHNICAL FIELD

Embodiments relate to a pressure indicator for a high-pressure accumulator system for a vehicle.

BACKGROUND

A pressure indicator for a high-pressure accumulator system is known from European Patent Publication EP 1 219 942 A1. In this pressure indicator for hydraulic and/or pneumatic pressure systems, consisting of a housing with a pressure side which is connectable to a pressure space of the pressure system and of an opposite indicating side, and also of an indicating element guided displaceably between the pressure side and indicating side in the housing, the indicating element is pressurizable on the pressure side and is thereby displaceable counter to spring force from an inoperative position into a pressure-indicating position of the indicating side. The pressure indicator may be produced inexpensively because of the very simple design thereof and is therefore also suitable as a mass-produced product. The components are preferably held within the housing without screw connections. This is achieved on the indicating side by a flanged closure element. In addition, damping means for damping the movement of the indicating element are provided.

Pressure indicators of this type permit rapid visual discernment of the respective pressure state. In the unpressurized state, the pin-like indicating element is in the inoperative position thereof, which is brought about by spring force and in which the end surface thereof ends approximately flush with a housing on the indicating side. In the event of pressurization, the indicating element is moved counter to the spring force into the pressure-indicating position thereof, which protrudes in a visually discernible manner over the housing. Such pressure indicators are generally suitable only for relatively low pressures.

Although pressure indicators, such as the pressure indicator disclosed in European Patent Publication EP 1 219 942 A1, are fundamentally suitable for higher pressures, the pressure indicators do not have any security against excess pressure and have a limited function at low temperatures, since the sealing ring may jam the indicating element. The use of a closure element as a holding device for the sealing ring necessitates an additional component which increases the costs but reduces the security at very high pressures, since the component has to withstand the compressive force of the sealing ring.

A multiplicity of rupture screw connections for constructing containers and for valves are known in the prior art. Rupture discs are effective means of protecting against pressure losses which protect a container or a system from damaging excess pressure or under-pressure by an expendable diaphragm rupturing. Rupture discs are therefore a type of predetermined breaking point. The diaphragm is generally a thin metal foil made of steel or stainless steel. Rupture discs are frequently used in conjunction with a safety valve in order to ensure the tightness of the system protected therewith during normal operation.

Both German Patent Publication DE 1 000 197 B and German Patent Publication DE 916 140 C disclose the use of rupture discs in conjunction with indicating elements. However, in both cases, the indicating element is connected downstream of the rupture disc and is used only reliably to indicate the response of the rupture disc and therefore the rupturing thereof.

In many applications, a permissible operating pressure of a pressure accumulator container or of a high-pressure accumulator system has to be reliably maintained, in particular over the course of a filling operation, in order to prevent damage to pressure accumulator containers and pressure lines. It is frequently desirable for the operating pressure also to be indicated reliably at the same time.

SUMMARY

Embodiments relate to an enhanced pressure indicator which, in addition to a pressure-indicating function, also carries out a pressure relief function and is connected, in particular permanently, to a high-pressure accumulator system and operates without electric and electronic components.

In accordance with embodiments, the components may be provided as simply and inexpensively as possible. The pressure indicator in accordance with embodiments requires the stored medium to be, in particular, gaseous and to customarily reach 1000 bar of pressure under operating conditions and to be exposed to temperatures in a range of between −40° C. to approximately 100° C. and to continued soiling, in particular on the underbody of a vehicle. The pressure indicator has to function satisfactorily over a service life of approx. 10 years, with absolute tightness across all pressure and temperature ranges under all operating conditions and over the entire service life.

In accordance with embodiments, enhanced high-pressure accumulator systems are provided having increased operational reliability.

In accordance with embodiments, a pressure indicator for a high-pressure accumulator system includes at least one of: a housing having a chamber with an indicating element guided movably therein, the movably guided indicating element having a relief channel configured for closing by a non-reversibly operating pressure relief device; and at least one compression spring, wherein the movably guided indicating element is pressurizable on a side facing a pressure-monitoring region and is thus movable reversibly counter to the spring force of the at least one compression spring from a starting position into a pressure-indicating position.

The result is a highly compact, purely optomechanical and visually perceptible pressure indicator which, owing to a preselected spring force, above a certain pressure brings an indicating element, for example an indicating pin, into an indicating position which is readily visible to an operator of the high-pressure accumulator system. The overall system is likewise protected against rupturing, and the medium accumulated in the high-pressure accumulator system is removed in a specific manner in an extreme situation.

In accordance with embodiments, high pressure in this context indicates any pressure lying above one bar.

In accordance with embodiments, the optomechanical and visually perceptible pressure indicator is advantageous in the fact that the pressure indication is insensitive to impact, and the integrated, permanently tight pressure relief device non-reversibly opens only when the operating pressure is exceeded and/or the permissible ambient temperature is exceeded. The integrated combination of a mechanical indicator for excess pressure and a non-reversible temperature-dependent manner of protecting against excess pressure are advantageously used in, for example, closure screws for high-pressure accumulator systems for CNG or hydrogen gas.

In accordance with embodiments, a high-pressure accumulator system for a vehicle includes at least one pressure indicator operatively connected to a high-pressure accumulator system.

In accordance with embodiments, the term vehicle may encompass aircraft, watercraft, rail vehicles in addition to motor vehicles.

The use of the pressure indicator in accordance with embodiments, by itself and also in combination with one or more pressure accumulator containers, serves to increase the security against overfilling the high-pressure accumulator system during replenishment and permits a simple, rapid and reliable diagnosis relating to the current filling state of the high-pressure accumulator system. This is particularly important in the event of presumed malfunctions of the high-pressure accumulator system and in the event of pending maintenance work.

The pressure indicator in accordance with embodiments is particularly suitable for different fluid media, such as hydrogen, methane, natural gas or a mixture of hydrogen and natural gas. Appropriate modifications also permit use with liquid gas (LPG) and other fluid media.

In accordance with embodiments, the pressure indicator may be designed in such a manner that the relief channel is arranged as an axial bore in the indicating element. The relief channel thus connects the pressure-monitoring region in the interior of the pressure indicator over a very direct and short path to the indicating region located outside a high-pressure accumulator system, and the corresponding indicating element may be manufactured in a simple manner. The relief channel does not have to be produced by drilling; production by way of, for example, casting would also be possible.

In accordance with embodiments, the movably guided indicating element has at least one sealing element. The sealing element is designed, for example, as an O-ring in conjunction with a supporting ring. The sealing element may be arranged either in a groove radially on the outside of the indicating element, or alternatively also in a groove in a preferably cylindrical region of a chamber of the basic body of the pressure indicator. For the purpose of better movability of the indicating element and improved gas tightness, sliding surfaces on the indicating element or in the chamber of the basic body are preferably polished.

In accordance with embodiments, one end of the movably guided indicating element preferably has a piston head having an increased diameter. The enlarged piston head is suitable particularly for the arrangement of the pressure relief device which is integrated in the indicating element. In addition, the step arising between a diameter in the sealing region and the increased diameter of the piston head may serve as a support for a damping element and/or as a stop for the indicating element.

In one embodiment of the pressure indicator in accordance with the invention, the non-reversibly operating pressure relief device is arranged on a side of the movably guided indicating element facing the pressure-monitoring region. A particularly advantageous effect in the case of a rupture disc as the pressure relief device is realized when an expansion space is provided between the rupture disc and relief channel in the indicating element. The expansion space is designed in such a manner that the rupture disc, which may be designed as a reversible rupture disc, may rupture without obstruction and the relief channel may not be shifted by parts of the rupture disc. A further advantage of this embodiment resides in the fact that the rupture disc is readily protected against external effects such as, for example, debris, dirt and damage.

In accordance with embodiments, the pressure indicator includes a non-reversibly operating pressure relief device which is arranged on a side of the movably guided indicating element facing away from the pressure-monitoring region.

In accordance with embodiments, the pressure indicator includes a non-reversibly operating pressure relief device that may be configured to operatively move, respond and/or react in a temperature-dependent manner. Such a devices may be fusible plugs made of materials having a defined melting point. However, combustible materials may also be used in devices responding in a temperature-dependent manner. A particularly advantageous effect in this embodiment is that the pressure relief device responds as soon as there is an impermissible increase in temperature such that the internal pressure of the high-pressure accumulator system does not reach a dangerously high value.

In accordance with embodiments, the non-reversibly operating pressure relief device may be configured to operatively react in response to elevated pressure. This device reacting to elevated pressure is depicted in the figures below as a rupture disc. The rupture discs are connected, in accordance with embodiments, in an integrally bonded manner, in particular welded. However, the devices reacting to elevated pressure may also be, for example, soldered or adhesively bonded to the indicating element, and also fitted therein or flanged thereto.

In accordance with embodiments, a response pressure of the pressure indicator, meaning, the pressure in the pressure-monitoring region in which the indicating element is visibly displaced into the indicating region, is determined by the spring force of the compression spring. The indicating pressure is advantageously set to a low value, and therefore, the pressure indicator indicates even a small residual pressure in the high-pressure accumulator system in a clearly discernible manner.

In accordance with embodiments, a particularly advantageous effect is realized when the movably guided indicating element has a damping element, such as, for example, a disc spring. The disc spring may be arranged in such a manner that it, first of all, permits a certain displacement of the indicating element without a counterforce. The spring force of the disc spring may be configured in such a manner that it responds only to a predetermined threshold, such as, for example, above at least two bar of operating pressure, in which the indicating element comes to a mechanical stop. The spring force of the disc spring may be configured in such a manner that it responds only to a predetermined threshold, such as, for example, at 10 bar of operating pressure, in which the indicating element comes to a mechanical stop. This is advantageous that a two-stage indication of pressure is possible. In addition, the disc spring acts as a damping element in the damping stop between indicating element and basic body.

In accordance with embodiments, in the pressure indicator, in which the enlarged piston head lies on that side of the movably guided indicating element that faces away from the pressure-monitoring region, the movably guided indicating element may have a locking ring configured to support the compression spring, and/or as a stop for the indicating element on the basic body. The indicating element is thus also held captively in the basic housing of the pressure indicator.

In accordance with embodiments, the movably guided indicating element may have an indicating pin at the end facing an indicating region. A screwed-in or inserted indicating pin may be composed of a low-friction plastic or metal coated in a plastic material. The gap with respect to the basic body may thereby be kept very small without having to be concerned about jamming of the indicating element. The relief channel arranged in the movably guided indicating element is continued in the indicating pin at least to an extent such that, after the non-reversibly operating pressure relief device has responded, the medium which possibly emerges may flow from the pressure-monitoring region into the indicating region.

In accordance with embodiments, the piston head or the indicating pin may have at least one marking, in which, two different markings or indicia are arranged on the piston head or the indicating pin in such a manner that two different operating-pressure levels are indicated in a visually perceptible manner. The markings may be designed, for example, as encircling grooves or scores (coloured or plain). In particular, in the above-described interaction of the compression spring with the damping element, a plurality of operating-pressure levels essential for the operation of the high-pressure accumulator system, namely no excess pressure (the system is empty), residual pressure and/or operating pressure may thus be depicted in a visually discernible manner in the indicating region by the pressure indicator.

In accordance with embodiments, the basic body has an installation thread and is screwable with an installation sealing ring into a recess of a receiving block. This permits an especially modular construction and a simple and cost-saving installation of the pressure indicator. Pressure indicators of this type may be used, for example, as valve combinations in the inlet region of tanks or tank systems of vehicles in order to prevent overfilling of the pressure accumulator container with fuel during a topping-up or filling operation. The indicating element and/or the basic body may be produced from a material which readily slides. The operation is optimized by selecting a material which is adapted to the very high pressures (customarily 200 to 1000 bar). Preferred materials and combinations of material are familiar to a person skilled in the art.

In accordance with embodiments, the relief channel may be connected to a line for disposing of emerging medium. This enables (combustible) medium which possibly emerges to be transported away from the immediate vicinity of the pressure indicator and to be further treated at low pressure at a suitable location without endangering vehicle occupants.

In accordance with embodiments, a pressure indicator for a high-pressure accumulator system may include at least one of the following: a body having a chamber; at least one compression spring; a pressure indicating element having a channel and which moves in the chamber between a starting position and a pressure-indicating position in response to pressure on a side facing a pressure-monitoring region and which is counter to a force of the at least one compression spring on the pressure indicating element; and a non-reversibly operating pressure relief device configured to close the relief channel.

In accordance with embodiments, a system for a vehicle may include at least one of the following: a high-pressure accumulator; and at least one pressure indicator operatively connected to the high-pressure accumulator, the at least one pressure indicator including: a body having a chamber; at least one compression spring; a pressure indicating element having a channel and which moves in the chamber between a starting position and a pressure-indicating position in response to pressure on a side facing a pressure-monitoring region and which is counter to a force of the at least one compression spring on the pressure indicating element; and a non-reversibly operating pressure relief device configured to close the relief channel.

In accordance with embodiments, a pressure indicator may include at least one of the following: a body having a chamber; and a pressure indicating element having a channel and which moves in the chamber between a starting position and a pressure-indicating position in response to pressure on a side facing a pressure-monitoring region and which is counter to a force on the pressure indicating element.

DRAWINGS

Embodiments will be illustrated by way of example in the drawings and explained in the description below.

DESCRIPTION

Figure 1:
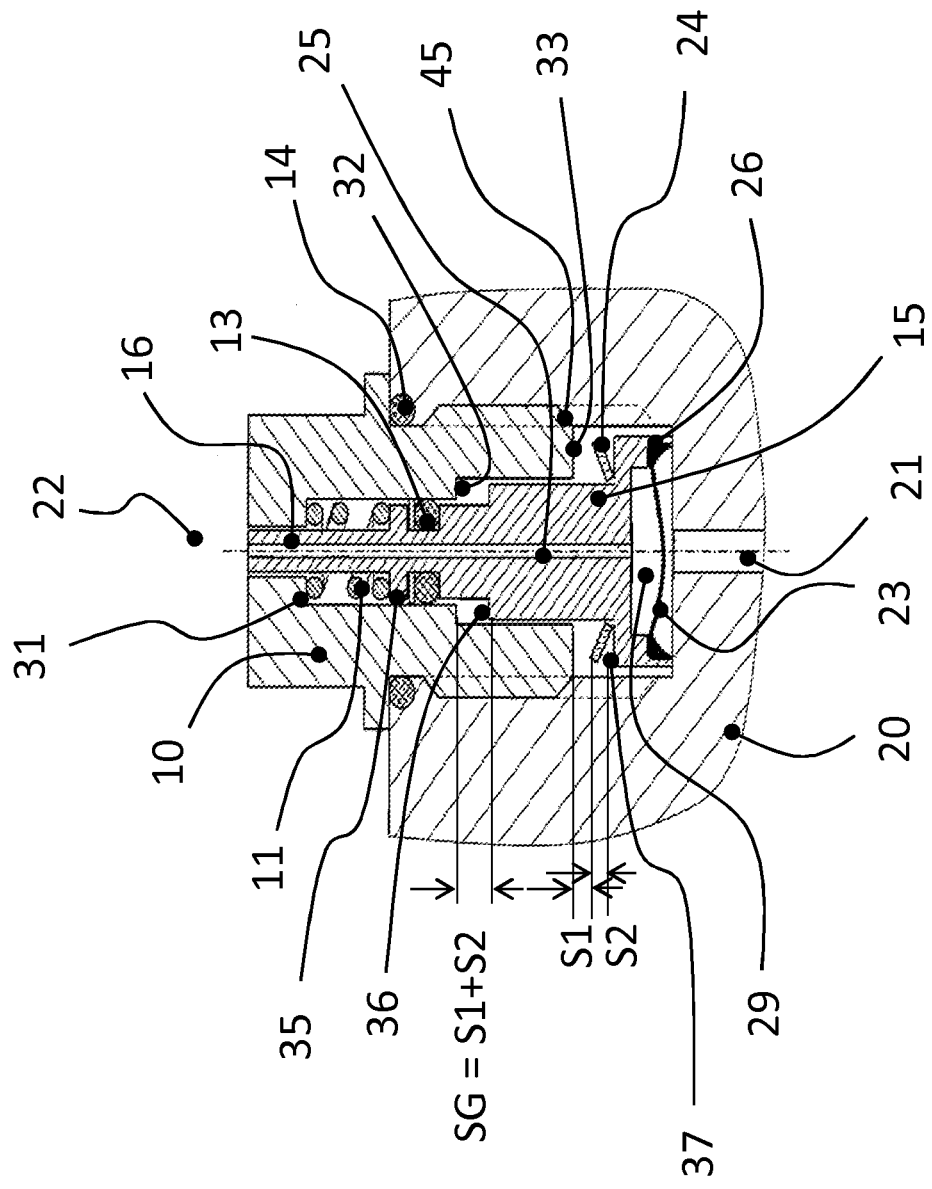
FIG. 1 illustrates a sectional view of a pressure indicator in accordance with embodiments having a rupture disc on a side of a pressure-indicating element which faces a pressure-monitoring region.

The pressure indicator which is illustrated by way of example in FIG. 1 includes a basic body 10. The basic body 10 may be a single part. The basic body 10 may be composed of non-corroding steel. The basic body 10 may, for example, take the form of a closure screw which is hollow-bored in two stages. The outside diameter of an axially displaceable indicating element 15, which may be composed of the same material as the basic body 10, may be designed in at least two stages if an indicating pin 16 is screwed or inserted into the indicating element 15. The single-part design of the indicating element 15 with an integrated indicating pin 16, the outside diameter of the indicating element 15 is illustrated in three stages. The indicating element 15 is hollow-bored 25 continuously on the inside, as is the indicating pin 16, if the indicating pin 16, in one embodiment, is fixed in the indicating element 15. Furthermore, the indicating element 15 is hollow-bored in two stages and has a tightly fitted rupture disc 23 in the larger opening. In accordance with embodiments, the rupture disc 23 may be welded 26 to the indicating element 15 and may be designed as a reversible rupture disc 23. The rupture disc 23 may be designed in the response behaviour thereof in such a manner that it non-reversibly opens at a maximum ambient temperature once the pressure exceeds at least 5% of the maximum permissible operating pressure, but safely below the maximum permissible operating pressure of the entire system.

The rupture disc 23 may be designed in such a manner that it lowers the opening pressure thereof in the event of the maximum permissible ambient temperature being exceeded. This has the advantage that opening within the operating conditions is avoided, but, for example, in the event of a fire, the system is rapidly relieved of pressure. Furthermore, when the rupture disc 23 is open, the high-pressure accumulator system is no longer pressurizable and therefore the high-pressure accumulator system urgently requires checking in relation to an exceeding of the operating pressure.

The bore 25 in the indicating element 15 is designed in such a manner that the outflow speed of the accumulated medium is controlled. This may be represented by the cross section of the bore or by taperings of the cross section.

As an actuator for the indicating element 15, use is made of one or two compression springs 11 in such a manner that, in the unpressurized state, the indicating element 15 is fixed with the indicating pin 16 in the starting position thereof such that the indicating pin 16 ends as flat as possible with the basic body 10. A spiral spring 11 as the compression spring may be combined with a disc spring 24. The compression spring 11 may have a spring force which corresponds to a very small excess pressure in the system, and an indicating element 15 which has not been pushed out indicates that safe opening of the high-pressure accumulator system is possible.

The disc spring 24 may be mounted in position in such a manner that it permits a certain displacement of the indicating element without a counterforce, and the counterforce of the disc spring 24 may be configured in such a manner that it responds only above a predetermined threshold, such as, for example, at least 2 bar or at 10 bar of operating pressure, in which the indicating element 15 comes to a mechanical stop. The disc spring 24 may then be supported on the (disc-spring) support 37 of the indicating element 15 and on the damping stop 33 of the basic body 10. This has the advantage of enabling a two-stage indication of the pressure. In addition, the disc spring acts as a damping element in the damping stop 33 between indicating element 15 and basic body 10.

Figure 2:
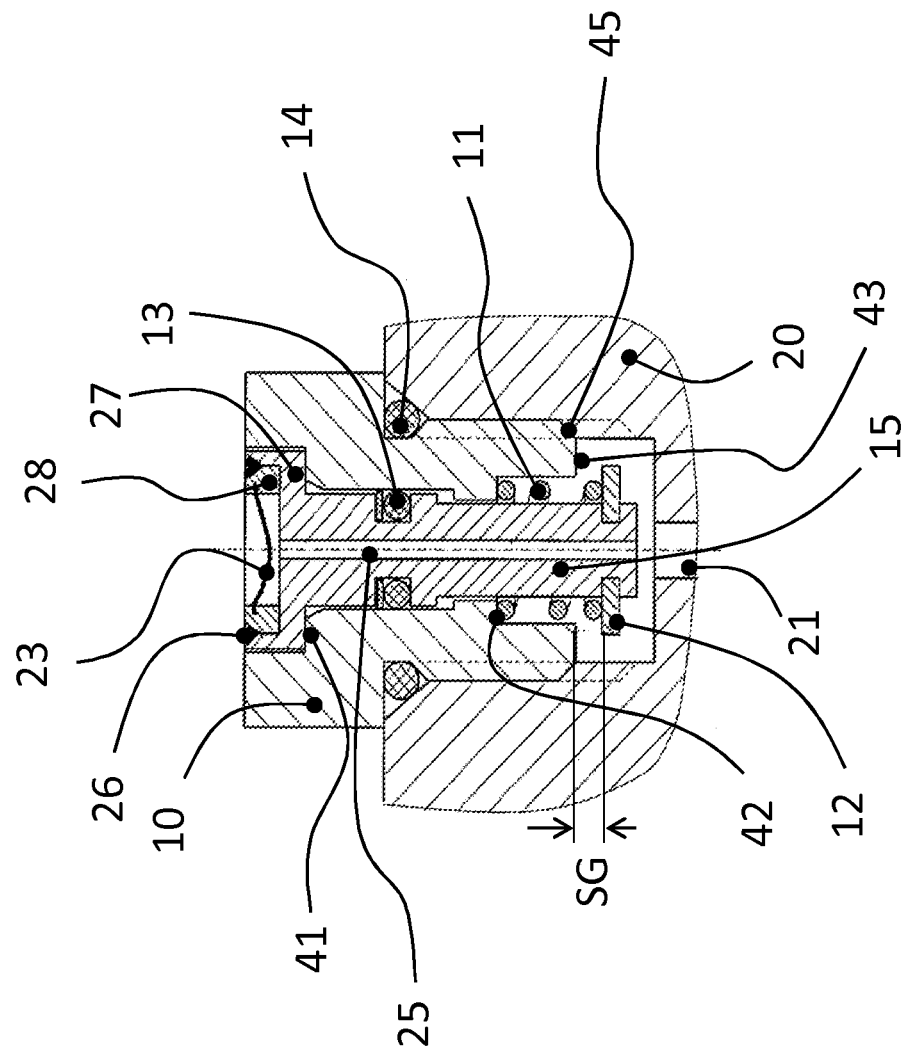
FIG. 2 illustrates a sectional view of a pressure indicator in accordance with embodiments having a rupture disc on a side of a pressure-indicating element which faces the indicating region.

An O-ring having a sealing or supporting ring 13 may be mounted as the sealing system between the basic body 10 and the indicating element 15. The fixing of the indicating element 15 counter to the spring force is firstly produced in the form of a stop in the basic body (FIG. 1) and secondly by a securing or locking ring 12 (FIG. 2).

The sequence of operation of the pressure indictor illustrated in FIG. 1 during operation is described below. As soon as pressure is built up in the pressure-monitoring region 21 and passes to the pressure indicator, the indicating element 15 is pressed (free stroke S1) in the direction of the outer/indicating region 22 counter to the force of the compression spring 11, which is supported on the spring supports 31 (on the basic body 10) and 35 (on the indicating element 15), as far as the stop of the disc spring 24, and the indicating pin 16 is therefore likewise pressed outwards. An excess pressure in the system is signalled by a coloured marking of the pin end. In the event of a further increase in pressure (pressure greater than at least 2 bar), the indicating element 15 may be pressed counter to the force of the disc spring 24 further outwards by the stroke S2 of the disc spring 24 as far as the mechanical stop of the piston stop 36 and basic body stop 32 (overall stroke SG is the sum of S1 and S2).

The increased operating pressure in the system may be indicated by a different coloured marking, such as, for example, a red ring. For automotive use, the counterforce of the disc spring 24 at the stop point of the indicating element 15 may correspond to 10 bar, the maximum operating pressure may be in a range of between 200 and 900 bar, and the minimum operating pressure is above 10 bar. When the pressure in the system is within the range between the minimum and maximum operating pressure, there is no movement of the indicating element 15. Only in the event of a service or at the end of the service life, when the pressure is let out of the system, will the indicating element 15 move out of the mechanical stop and indicate that the pressure has dropped below 10 bar of operating pressure.

Since, in automotive high-pressure accumulator systems, the minimum operating pressure currently does not drop below 10 bar for technical reasons, the indicating element with the indicating pin 16 always remains in the mechanical stop (overall stroke SG), thus protecting the sealing element 13.

The pressure above which the indicating element 15 is in each case displaced may be adjustable by the respective spring force of the compression spring 11 and of the disc spring 24, and values cited hereinabove are examples. This is also true of the rupture pressure of the rupture disc 23. When, for example, 5% of the maximum operating pressure is exceeded, the rupture disc 23 may open and allow the accumulated medium to flow out in a manner corresponding to the bore cross sections realized.

FIG. 2 illustrates a pressure indicator in accordance with embodiments includes an indicating element 15 and a basic body 10 designed a similar manner to that illustrated in FIG. 1, but the rupture disc 23 may be positioned in place of the indicating pin 16. This is advantageous in that, firstly, the pressure indicator may be produced highly cost-effectively and, secondly, the pressure indicator at the same time carries out a plurality of operations.

The exposed position of the rupture disc 23 causes it to be exposed directly to the ambient temperature, and therefore, in the event of an impermissible rise in temperature, such as, for example, in the event of a fire, the rupture disc 23 rapidly responds. As a result, the pressure indicator in accordance with embodiments may replace a temperature-controlled pressure reducer currently customary in cars. However, a temperature-controlled pressure reducer is not sufficient for protecting conventional high-pressure accumulator systems. A pressure-dependent switching device which opens the system in the event of excess pressure before the high-pressure accumulator system reaches the rupture pressure may be additionally required. For this purpose, a separate pressure-limiting valve may be installed in high-pressure accumulator systems of this type. This is no longer required with the pressure indicator in accordance with embodiments, since the pressure indicator opens in a temperature-dependent and/or pressure-dependent manner (i.e. limits the pressure) and additionally provides a (two-stage) indication of the pressure.

The relief channel 25 which may be aligned with the axis of movement of the indicating element 15, is configured to permit a pneumatic or hydraulic communication of the medium with the rupture disc 23 which is arranged facing the external region 22 in a carrier ring 28 and may be welded into the piston head 27.

In the event of being pressurized, the piston head 27 together with the receptacle for the rupture disc protrudes into the external region 22 by the entire stroke SG, and is therefore a readily visible indicator that the operating pressure in the system is greater than, for example, 10 bar. The visibility and the signalling effect are increased by colouring the piston head 27 in a signalling colour and are additionally enhanced by an identically coloured covering cap for the rupture disc 23. The rupture disc 23 protects the pressure system against the permissible operating pressure being exceeded, with it being possible for a further effect to be used by the position control.

The rupture disc 23 may be configured in such a manner that, at the maximum permissible ambient temperature, the rupture pressure lies above the maximum operating pressure. In the event of a fire, the ambient temperature rises, as a result of which the rupture pressure of the rupture disc 23 drops. A double amount of safety is therefore achieved in the event of a fire. If the pressure in the system rises because of heat at a location remote from the pressure indicator 15, in which case the safety valve is not thermally loaded, the safety valve opens at maximum 5% above the maximum operating pressure. If the pressure indicator, and therefore, the non-reversible pressure relief device 23, is directly exposed to the heat source, the rupture pressure is correspondingly reduced and, even at a lower pressure, the system is emptied. This operation is optimized by the protruding position of the piston head 27 with the rupture disc 23 even at a low system pressure. An embodiment with a closed form of the basic body 10 above the piston head 27 makes it possible for the medium to be removed in a specific manner by the possibility of connecting a line. However, the visual indication of the pressure is then no longer provided.

In the unpressurized state, the piston head 27 of the indicating element is pressed by the force of the compression spring 11 against the resting support 41 in the basic body 10.

If, for example, in the event of a filling operation, the pressure in the entire high-pressure accumulator system rises to an extent such that the pressure prevailing on the indicating element 15 causes the spring force of the compression spring 11, which is supported between the locking ring 12 and a spring support 42, to be overcome because of the force ratios, the indicating element 15 is pushed with the locking ring 12 against the stop 43 of the basic body 10 (entire stroke SG). This pressure corresponds to the indicating pressure.

As illustrated in FIGS. 1 and 2, the basic body 10 has an installation thread 45 and may be screwable with an installation sealing ring 14 into a recess of a receiving block 20 of the high-pressure accumulator system.

This alternative construction of the pressure indicator in accordance with the invention may be realized in a particularly space-saving manner. This pressure indicator may be installed in any valve body, tank adapter, accumulator or line part. The embodiments enumerated may be combined as desired.

All of the stated pressure values are by way of example and do not result in any limiting of the invention, and the solution in accordance with the invention may be realized for virtually any pressure ranges.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological signifimayce unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SIGNS

10 Basic body
11 Compression spring (spiral spring)
12 Securing ring
13 Sealing element
14 Installation sealing ring
15 Indicating element (piston)
16 Indicating pin
20 Receiving block (high-pressure accumulator system)
21 Pressure-monitoring region
22 Indicating region
23 Non-reversibly operating pressure relief device (rupture disc)
24 Disc spring
25 Relief channel
26 Weld seam
27 Piston head
28 Carrier ring (for rupture disc)
29 Expansion space
31 Spring support
32 Basic body stop
33 Damping stop
35 Spring support
36 Piston stop
37 Support
41 Resting support
42 Spring support
43 Stop
45 Installation thread
S1 Free stroke
S2 Stroke of the disc spring
SG Overall stroke

What is claimed is:

1. A pressure indicator for a high-pressure accumulator system, comprising:
a body having a chamber;
at least one compression spring;
a pressure indicating element having a relief channel configured to permit removal of, from the high-pressure accumulator system, a medium stored in the high-pressure accumulator system, and which moves in the chamber between a starting position and a pressure-indicating position in response to pressure on a side facing a pressure-monitoring region and which is counter to a force of the at least one compression spring on the pressure indicating element; and
a non-reversibly operating pressure relief device configured to close the relief channel.

2. The pressure indicator of claim 1, wherein the relief channel comprises an axial bore in the indicating element.

3. The pressure indicator of claim 1, wherein the pressure indicating element has at least one sealing element.

4. The pressure indicator of claim 1, wherein one end of the pressure indicating element has a piston head having a diameter which gradually increases.

5. The pressure indicator of claim 4, wherein one of the piston head and an indicating pin has at least one marking indicating an operating-pressure level.

6. The pressure indicator of claim 1, wherein the non-reversibly operating pressure relief device is arranged on a side of the pressure indicating element facing the pressure-monitoring region.

7. The pressure indicator of claim 1, wherein the non-reversibly operating pressure relief device is composed of a material which operatively reacts in response to a change in temperature.

8. The pressure indicator of claim 1, wherein the non-reversibly operating pressure relief device is composed of a material which operatively reacts in response to a change in pressure.

9. The pressure indicator of claim 1, wherein the non-reversibly operating pressure relief device is connected in an integral manner to the pressure indicating element.

10. The pressure indicator of claim 1, wherein a response pressure of the pressure indicating element is determined by the spring force of the at least one compression spring.

11. The pressure indicator of claim 1, wherein the pressure indicating element has a damping element.

12. The pressure indicator of claim 1, wherein the pressure indicating element has a locking ring.

13. The pressure indicator of claim 1, wherein the pressure indicating element has an indicating pin at an end facing an indicating region.

14. The pressure indicator of claim 1, wherein the body has an installation thread and is screwable with an installation sealing ring into a recess of a receiving block.

15. A system for a vehicle, comprising:
a high-pressure accumulator; and
at least one pressure indicator operatively connected to the high-pressure accumulator, the at least one pressure indicator including:
a body having a chamber;
at least one compression spring;
a pressure indicating element having a relief channel, and which moves in the chamber between a starting position and a pressure-indicating position in response to pressure on a side facing a pressure-monitoring region and which is counter to a force of the at least one compression spring on the pressure indicating element; and
a non-reversibly operating pressure relief device configured to close the relief channel, the non-reversibly operating pressure relief device being arranged on a side of the pressure indicating element facing away from the pressure-monitoring region.

16. The system of claim 15, wherein one end of the pressure indicating element has a piston head having a diameter which gradually increases.

17. The system of claim 16, wherein one of the piston head and a pressure indicating pin has at least one marking indicating an operating-pressure level.

18. A pressure indicator, comprising:
a body having a chamber;
a pressure indicating element having a relief channel into which is received a pressure indicator, and which moves in the chamber between a starting position and a pressure-indicating position in response to pressure on a side facing a pressure-monitoring region and which is counter to a force on the pressure indicating element; and
a non-reversibly operating pressure relief device configured to close the channel, the non-reversibly operating pressure relief device being arranged on a side of the pressure indicating element facing away from the pressure-monitoring region.

* * * * *